US012776916B2

(12) United States Patent
Farrell et al.

(10) Patent No.: US 12,776,916 B2
(45) Date of Patent: Oct. 27, 2026

(54) SECURING REMOTE REQUESTS TO VEHICLES

(71) Applicant: GM GLOBAL TECHNOLOGY OPERATIONS LLC, Detroit, MI (US)

(72) Inventors: Brian Farrell, Troy, MI (US); Jordan P. Rivington, Essex (CA); Karl B. Leboeuf, LaSalle (CA)

(73) Assignee: GM Global Technology Operations LLC, Detroit, MI (US)

( * ) Notice: Subject to any disclaimer, the term of this patent is extended or adjusted under 35 U.S.C. 154(b) by 103 days.

(21) Appl. No.: 19/039,161

(22) Filed: Jan. 28, 2025

(65) Prior Publication Data

US 2026/0222220 A1 Jul. 30, 2026

(51) Int. Cl.
*H04L 9/32* (2006.01)

(52) U.S. Cl.
CPC .......... *H04L 9/3242* (2013.01); *H04L 9/3213* (2013.01)

(58) Field of Classification Search
None
See application file for complete search history.

(56) References Cited

U.S. PATENT DOCUMENTS

2017/0011572 A1* 1/2017 Link, II ............. G07C 9/00182
2019/0173862 A1* 6/2019 Kim ........................ H04L 9/083
2019/0222423 A1* 7/2019 Takemori ................ G09C 1/00
2023/0362032 A1* 11/2023 Naka ................ H04L 12/40013
2024/0320368 A1* 9/2024 Mung ................... B60W 50/08

* cited by examiner

*Primary Examiner* — Sanchit K Sarker
(74) *Attorney, Agent, or Firm* — Quinn IP Law

(57) ABSTRACT

A system includes a vehicle, a broker, and a back office. The broker receives from a requestor a token and a request for a mechatronics ECU in the vehicle to process a task. The back office receives the token and the request, confirms that the requestor is authorized to send the request, generates a MAC for the request based on a key, generates a message protected by verification data, and transfers the request, the MAC, and the message to the broker. The broker transfers the request, the MAC, and the message to a telematics control unit in the vehicle. The telematics control unit verifies the MAC based on the key shared with the back office, checks an origin of the message, and transfers the request to the mechatronics electronic control unit in response to the MAC being valid and the message originating from the back office.

20 Claims, 5 Drawing Sheets

SECURING REMOTE REQUESTS TO VEHICLES

INTRODUCTION

The present disclosure relates to a system and a method for securing remote requests to vehicles.

A goal for software-defined vehicles is to have a constant connection to a publisher/subscriber broker to be able to efficiently support additional software updates and features. If the publisher/subscriber broker is compromised and thus able to spoof the sources of the requests, the vehicles may experience unintended operations.

Accordingly, those skilled in the art continue with research and development efforts in the field of systems and methods to secure requests to software-defined vehicles through publisher/subscriber brokers.

SUMMARY

A system is provided herein. The system includes a vehicle, a broker computer, and a back office computer. The vehicle includes a telematics control unit and a mechatronics electronic control unit. The broker computer is operational to receive from a requestor a token and a request for the mechatronics electronic control unit to process a task. The back office computer is operational to receive the token and the request from the broker computer, confirm that the requestor is authorized to send the request to the vehicle based on the token, generate a first message authentication code for the request based on a first key in response to the confirmation that the requestor is authorized, where the first key is unique to the telematics control unit, generate a first message that is protected by verification data, and transfer the request, the first message authentication code, and the first message to the broker computer. The broker computer is further operational to transfer the request, the first message authentication code, and the first message to the telematics control unit. The telematics control unit is operational to verify the first message authentication code based on the first key, wherein the first key is shared with the back office computer, check an origin of the first message, and transfer the request to the mechatronics electronic control unit in response to the first message authentication code being verified and the first message originating from the back office computer.

In one or more embodiments of the system, the telematics control unit is further operational to generate a second message authentication code based on a second key in response to the first message authentication code being verified, and transfer the second message authentication code with the request to the mechatronics electronic control unit. The second key is shared between the telematics control unit and the mechatronics electronic control unit.

In one or more embodiments of the system, the mechatronics electronic control unit is operational to verify the second message authentication code based on second key, and process the request in response to the second message authentication code being verified.

In one or more embodiments of the system, the telematics control unit is further operational to parse a freshness value received in the first message, and compare the freshness value with a current time. The second message authentication code is generated in response to the current time being less than a timeout period after the freshness value.

In one or more embodiments of the system, the back office computer is further operational to receive a notification in response to the telematics control unit being replaced in the vehicle with a new telematics control unit, and generate the first key based on the new telematics control unit.

In one or more embodiments of the system, the back office computer is further operational to derive the first key from a telematics control unit identification number and a unique unlock key provisioned in the telematics control unit during manufacture.

In one or more embodiments of the system, the telematics control unit is further operational to derive the first key from the telematics control unit identification number and the unique unlock key.

In one or more embodiments of the system, the requestor is a back office entity.

In one or more embodiments of the system, the requestor is a mobile phone.

A method to secure a remote request to a vehicle is provided herein. The method includes receiving at a broker computer from a requestor a token and a request for a mechatronics electronic control unit in the vehicle to process a task, receiving at a back office computer the token and the request from the broker computer, confirming in the back office computer that the requestor is authorized to send the request to the vehicle based on the token, generating in the back office computer a first message authentication code for the request based on a first key in response to the confirmation that the requestor is authorized, where the first key is unique to a telematics control unit in the vehicle, generating in the back office computer a first message that is protected by verification data, transferring the request, the first message authentication code, and the first message from the back office computer to the broker computer, transferring the request, the first message authentication code, and the first message from the back office computer to the telematics control unit, verifying in the telematics control unit the first message authentication code based on the first key, wherein the first key is shared with the back office computer, checking in the telematics control unit an origin of the first message, and transferring the request to the mechatronics electronic control unit in response to the first message authentication code being verified and the first message originating from the back office computer.

In one or more embodiments, the method includes generating in the telematics control unit a second message authentication code based on a second key in response to the first message authentication code being verified, and transferring the second message authentication code with the request from the telematics control unit to the mechatronics electronic control unit. The second key is shared between the telematics control unit and the mechatronics electronic control unit.

In one or more embodiments, the method includes verifying in the mechatronics electronic control unit the second message authentication code based on second key, and processing in the mechatronics electronic control unit the request in response to the second message authentication code being verified.

In one or more embodiments, the method includes parsing in the telematics control unit a freshness value received in the first message, and comparing in the telematics control unit the freshness value with a current time. The second message authentication code is generated in response to the current time being less than a timeout period after the freshness value.

In one or more embodiments, the method includes receiving at the back office computer a notification in response to the telematics control unit being replaced in the vehicle with a new telematics control unit, and generating in the back office computer the first key based on the new telematics control unit.

In one or more embodiments, the method includes deriving in the back office computer the first key from a telematics control unit identification number and a unique unlock key provisioned in the telematics control unit during manufacture.

In one or more embodiments, the method includes deriving in the telematics control unit the first key from the telematics control unit identification number and the unique unlock key.

In one or more embodiments of the method, the requestor is a back office entity.

In one or more embodiments of the method, the requestor is a mobile phone.

A vehicle is provided herein. The vehicle includes a mechatronics electronic control unit and a telematics control unit. The mechatronics electronic control unit is operational to perform a task. The telematics control unit is in communication with the mechatronics electronic control unit and is operational to receive from a requestor through a broker computer a request, a first message authentication code, and a first message. The requestor is confirmed as authorized to send the request to the vehicle based on a token before the request is transferred to the vehicle. The first message authentication code for the request is generated based on a first key in response to the confirmation that the requestor is authorized. The first key is unique to the telematics control unit. The first message is protected by verification data. The telematics control unit is further operational to verify the first message authentication code based on the first key, where the first key is shared with a back office computer, check an origin of the first message, generate a second message authentication code based on a second key in response to the first message authentication code being verified, where the second key is shared between the telematics control unit and the mechatronics electronic control unit, and transfer the request and the second message authentication code to the mechatronics electronic control unit in response to the first message authentication code being verified and the first message originating from a back office computer. The mechatronics electronic control unit is further operational to verify the second message authentication code based on second key, and process the request to perform the task in response to the second message authentication code being verified.

In one or more embodiments of the vehicle, the telematics control unit is further operational to parse a freshness value received in the first message, and compare the freshness value with a current time. The second message authentication code is generated in response to the current time being less than a timeout period after the freshness value.

The above features and advantages and other features and advantages of the present disclosure are readily apparent from the following detailed description of the best modes for carrying out the disclosure when taken in connection with the accompanying drawings.

DETAILED DESCRIPTION

Embodiments of the disclosure generally provide a system and/or method for a software-defined vehicle (SDV) connection to a publisher/subscriber broker computer in the cloud to efficiently support additional services. The system/method has message authentication codes that are sent with requests that a compromised broker computer is not able to create for lack of access to cryptographic keys. Furthermore, a secure environment is established within an in-vehicle device that verifies messages from a back office. The messages are protected with verification data that an application domain within the in-vehicle device cannot create, which prevents the application domain from sending the requests to other in-vehicle devices.

Figure 1:
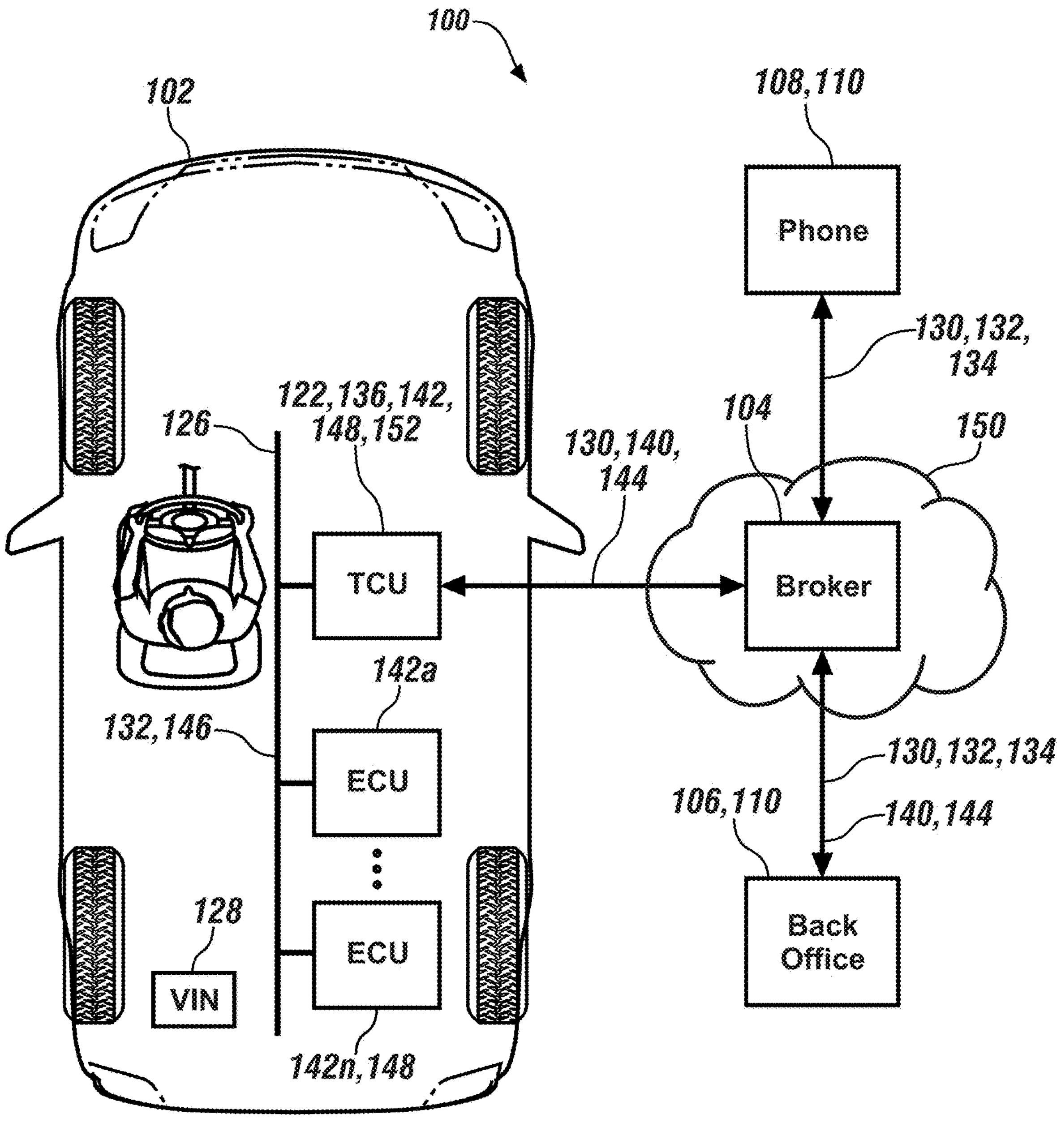
FIG. 1 is a schematic plan diagram of a system in accordance with one or more exemplary embodiments.

Referring to FIG. 1, a schematic plan diagram of an example system is shown in accordance with one or more exemplary embodiments. The system 100 generally includes a vehicle 102, a broker computer 104, a back office 106, and one or more mobile phones 108 (one shown). The vehicle 102 includes a telematics control unit 122 (TCU), one or more mechatronics electronic control units 142*a*-142*n* (ECU), a vehicle bus 126 and a vehicle identification number 128 (VIN). The TCU 122 includes a unique TCU identification number 136 (TCU ID).

The system 100 is operational to protect the ECUs 124*a*-124*n* from performing unapproved tasks in response to requests from requestors 110 (e.g., the back office 106 and/or mobile phones 108) due to one or more compromises of the broker computer 104 and/or the TCU 122. The broker computer 104 receives from the requestor 110 a token 130, a request 132, and a target VIN 134 for the mechatronics ECU 142*a*-142*n* in the vehicle 102 to process the task. The broker computer 104 transfers the token 130, the request 132, and the target VIN 134 to the back office 106. Computers within the back office 106 may confirm that the requestor 110 is authorized to send the request 132 to the vehicle 102 based on the token 130 where the target VIN 134 matches the VIN 128 in the vehicle 102, and that the token 130 indicates that the requestor 110 is authorized to send such requests 132 to this vehicle 102. A first message authentication code 140 (MAC) for the request 132 is generated in the back office 106 based on a first key 142 in response to the confirmation that the requestor 110 is authorized. The first key 142 is unique to the telematics control unit 122. A first message 144 that is protected by verification data is also generated in the back office 106. The request 132, the first MAC 140, and the first message 144 are sent to the broker computer 104. The broker computer 104 may transfer the request 132, the first MAC 140, and the first message 144 to the TCU 122.

The TCU 122 verifies the first MAC 140 based on the first key 142 and checks an origin of the first message 144. If the first MAC 140 is verified and the first message 144 originates from the back office 106, the TCU 122 generally concludes that the request 132 as received is good. The TCU 122 subsequently generates a second MAC 146 based on a second key 148. The second key 148 is shared between the TCU 122 and an intended mechatronics ECU (e.g., 124*n*). The request 132 and the second MAC 146 are sent across the vehicle bus 126 (or other suitable interface) to the intended mechatronics ECU 124*n*.

The intended mechatronics ECU 124*n* verifies the second MAC 146 based on second key 148. If the second MAC 146 is verified per the second key 148 in the intended mechatronics ECU 124*n*, the task defined by the request 132 may be performed by the intended mechatronics ECU 124*n*.

The vehicle 102 implements a software-defined vehicle (SDV). The vehicle 102 may be a gas-powered vehicle, an electric vehicle, a hybrid vehicle, or a plug-in hybrid vehicle. In various embodiments, the vehicle 102 may include, but is not limited to, a passenger vehicle, a truck, an autonomous vehicle, a gas-powered vehicle, an electric-powered vehicle, a hybrid vehicle, a motorcycle, a boat, and/or an aircraft. Other types of vehicles 102 may be implemented to meet the design criteria of a particular application.

The broker computer 104 implements a publisher/subscriber computer. In various embodiments, the broker computer 104 may be implemented as one or more cloud computers (e.g., message queuing telemetry transport (MQTT) cloud computers) in a cloud 150. The broker computer 104 communicates with the vehicle 102 and the mobile phones 108 via one or more wireless networks.

The back office 106 implements an original equipment manufacturer (OEM) office or back office for the vehicle 102. The back office 106 generally includes one or more computers. The back office 106 may communicate with the broker computer 104 via wired and/or wireless communication links.

Each mobile phone 108 implements a portable smart device. The mobile phones 108 may be implemented as wireless digital communication devices. In various embodiments, the mobile phones 108 may include, but are not limited to, cellular telephones, smart watches, personal digital assistances, netbooks, notepads, laptop computers, desktop computers and the like. Other types of smart devices may be implemented to meet the design criteria of a particular application.

The TCU 122 implements a set of electronics that enables wireless voice and/or data communication over wireless carrier systems, via wireless networking, and the vehicle bus 126. The wireless networking generally enables the vehicle 102 to communicate with the broker computer 104, other telematics-enabled vehicles, and/or other entities and devices. By providing the data communications, TCU 122 enables the vehicle 102 to offer a number of different services including those related to navigation, telephony, emergency assistance, diagnostics, infotainment, and the like. Data may be sent either via a data connection, such as via packet data transmission over a data channel, or via a voice channel using techniques available in the art. The TCU 122 is programmable to know the VIN 128 of the vehicle 102 in which it is installed. The TCU 122 may include a TCU identification number 136, and a TCU unique identification number 152.

Each mechatronics ECU 124*a*-124*n* implement an electronic control unit (ECU) and similar circuitry within the vehicle 102. The mechatronics ECUs 124*a*-124*n* are operational to perform a variety of automotive functions within the vehicle 102. The mechatronics ECUs 124*a*-124*n* communicate among each other and the TCU 122 via the vehicle bus 126.

The vehicle bus 126 implements a digital communication bus. In various embodiments, the vehicle bus 126 may be an Ethernet-based local area network (LAN) bus, a Controller Area Network (CAN) bus, or the like. The vehicle bus 126 provides multi-directional digital communications among the TCU 122, the mechatronics ECUs 124*a*-124*n*, and other electronics within the vehicle 102. Other types of busses may be implemented to meet the design criteria of a particular application.

The VIN 128 implements a unique code, including a serial number, that is used by the automotive industry to identify individual vehicles. The VIN 128 may be a permanent part of the vehicle 102.

Figure 2:
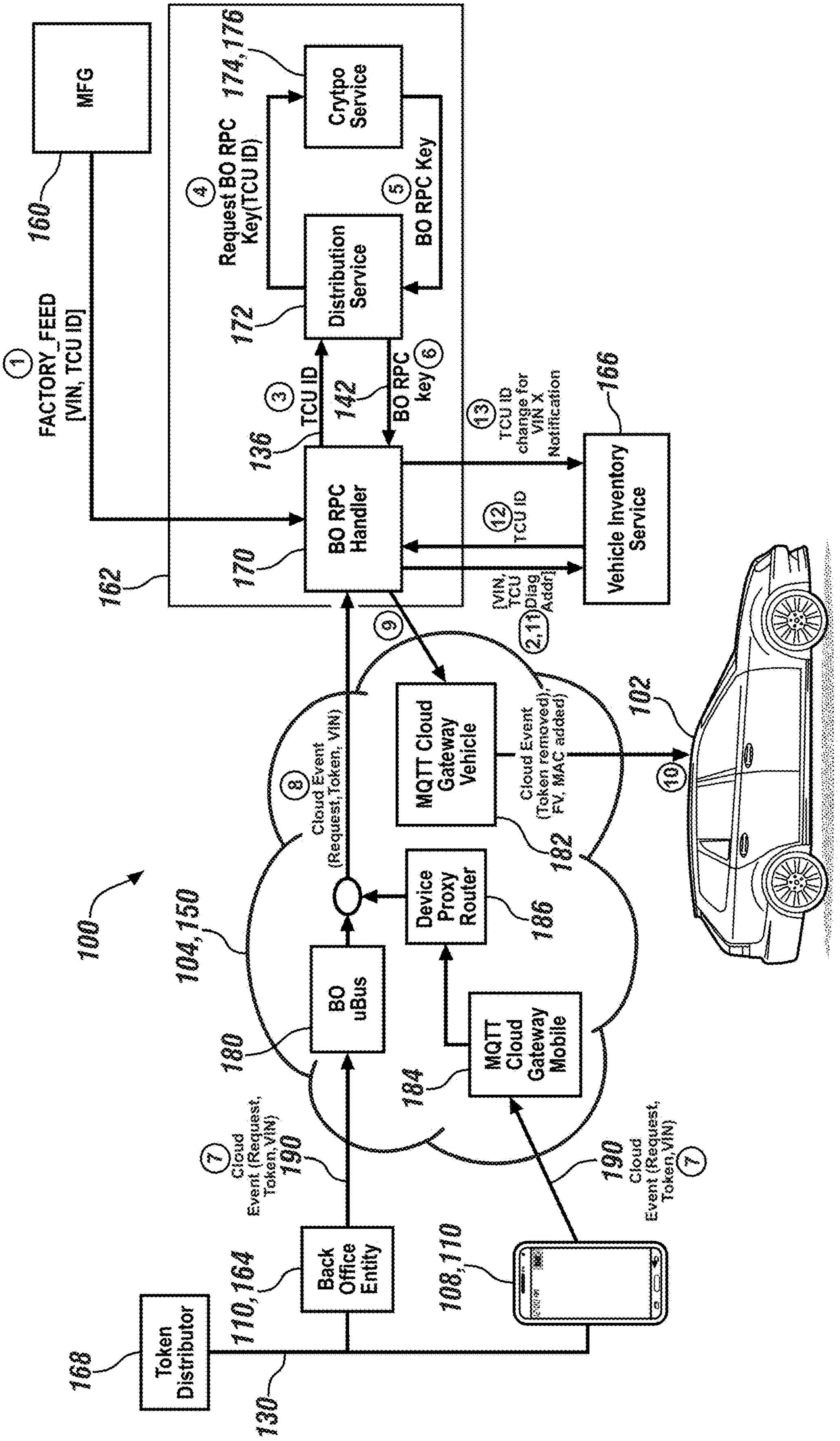
FIG. 2 is a detailed schematic diagram of the system in accordance with one or more exemplary embodiments.

Referring to FIG. 2, a detailed schematic diagram of the system 100 is shown in accordance with one or more exemplary embodiments. The system 100 generally includes the vehicle 102, the broker computer 104, the mobile phones 108, and the cloud 150. The system 100 further includes a manufacturing facility 160, one or more back office computers 162 (one shown), a back office entity 164, a vehicle inventory service computer 166, and a token distributor 168. The broker computer 104 includes a back office bus device 180, an MQTT cloud gateway-to-vehicle device 182, an MQTT cloud gateway-to-mobile device 184, and a device proxy router 186. The back office computer 162 includes a back office remote procedure call (RPC) handler 170, a distribution server 172, and a cryptographic server 174 (e.g., an in-vehicle electronic control unit cryptographic system). In various embodiments, the back office computer 162 and the back office entity 164 are part of the back office 106 (see FIG. 1).

In order to establish a shared secret with the vehicles 102 (individually or in a fleet of vehicles) to protect various requests the following steps may be performed 1. The back office RPC handler 170 may obtain in a factory feed from the manufacturing facility 160 the VINs 128 and the TCU unique identification numbers 152 of vehicles 102 produced at an original equipment manufacturer (OEM) assembly plant.
2. The back office RPC handler 170 generally subscribes to the vehicle inventory service computer 166, providing each VIN 128 and corresponding TCU unique identification number 152, to be notified of changes associated with the TCU 122 currently in the vehicle 102 (e.g., a TCU replacement with a new TCU).
3. The back office RPC handler 170 may provide the TCU identification number 136 to the distribution server 172 to seek the first key 142 (e.g., a back office RPC key) for the corresponding TCU 122. The first key 142 is unique to the corresponding TCU 122.
4. The distribution server 172 requests the first key 142 from the cryptographic server 174 by providing the TCU identification number 136.
5. The cryptographic server 174 derives the first key 142 from the TCU identification number 136 and a unique unlock key 176 provisioned to each TCU 122 during manufacturing. The cryptographic server 174 subsequently transfers the first key 142 to distribution server 172.
6. The distribution server 172 provides the first key 142 to the back office RPC handler 170. The back office RPC handler 170 securely stores the VIN 128, the TCU identification number 136, and the first key 142 together as a tuple in order to be able to protect relevant requests 132 with the first key 142, that is unique to the TCU 122 of the particular vehicle 102.

In order to protect the requests originating from the mobile phones 108 and the back office entity 164 from a compromise in the publication/subscription broker computer 104 and/or a compromise in an application domain within the in-vehicle TCU 122, the following steps may be performed:

7. A particular type of cloud events 190 (e.g., a vehicle access request, a vehicle immobilization request, and the like) is sent from the requestor 110 (e.g., the back office entity 164 or the mobile phone 108) that contains the request 132, a token 130, and the target VIN 134.
    7i. The requestor 110 generally requests the token 130 from the token distributor 168. The token distributor 168 verifies that the requestor 110 has permission to obtain the token 130.
8. The cloud event 190 is provided to the back office RPC handler 170 to (i) check if the request 132 is authorized and (ii) to add data to the request 132 to allow a TCU secure enclave to verify the authenticity of the request 132.
    8i. The back office RPC handler 170 verifies that the request 132 is authorized by verifying the token 130 and the associated permissions contained within the token 130.
    8ii. The back office RPC handler 170 looks up the VIN 128 in an internal database to obtain the first key 142 associated with the TCU 122 in the vehicle 102.
        1) If the VIN 128 does not exist in the database of the back office RPC handler 170, the back office RPC handler 170 calls the vehicle inventory service computer 166 that maintains the VIN-to-TCU identification number associations to obtain the TCU identification number 136 associated with the VIN 128 and perform the steps 3 to 6 to obtain and store the first key 142.
    8iii. If appropriate, the back office RPC handler 170 may translate the service and RPC strings in the cloud event 190 into a message identification number (e.g., service ID|method ID) of the vehicle service that will process the request 132 in the in-vehicle mechatronics ECU 124*a*-124*n*. The symbol "|" may represent a concatenation operation.
    8iv. The back office RPC handler 170 may insert the following data into the cloud event 190 to enable the TCU] secure enclave to verify the authenticity of the request 132.
        1) SecOCDataID (5 bytes): Message Type (i.e., 0xFD)|Message ID (4 bytes), where "SecOC" means secure onboard communications.
        2) Interface Version (Service Major Version)—1 byte
        3) Payload: If the message payload being sent from the TCU 122 to the mechatronics ECU 124*a*-124*n* in the vehicle 102 is different than the payload contained in the cloud event 190 (X bytes)
        4) Freshness value (e.g., Unix time): Number of seconds that have elapsed since 00:00:00 UTC on 1 Jan. 1970 (8 bytes)
        5) First Message Authentication Code (MAC) over the SecOCDataID|Interface Version|Payload|Freshness value Note: The payload may be the same payload to be sent from the TCU 122 to the mechatronics ECU 124*a*-124*n*] in the vehicle 102 that is responsible for processing the request.

9. The back office RPC handler 170 generally provides the cloud event 190 with the additional verification data to the MQTT cloud gateway-to-vehicle device 182. The MQTT cloud gateway-to-vehicle device 182 removes the token 130.
10. The MQTT cloud gateway-to-vehicle device 182 sends the cloud event 190 with additional verification data to the vehicle 102.
11. In order to ensure that the first key 142 associated with the vehicle 102 is correct, the back office RPC handler 170 may use the vehicle inventory service computer 166 after processing a request 132 to ensure the TCU identification number 136 is associated with the VIN 128. The back office RPC handler 170 provides the VIN 128 and the TCU unique identification number 152 to the vehicle inventory service computer 166 to get the TCU identification number 136 associated with VIN 128.
12. The vehicle inventory service computer 166 provides the TCU identification number 136 associated with the VIN 128 to the back office RPC handler 170. If a mismatch between the stored values and the provided value are detected, the back office RPC handler 170 updates the database and performs steps 3 to 6 to obtain and store the first key 142.
13. The vehicle inventory service computer 166 notifies the back office RPC handler 170 if a change has taken place in the TCU data associated with a vehicle VIN 128 that was provided in step 2 (e.g., if the current TCU 122 is replaced as part of service operation) so that the back office RPC handler 170 may update the first key 142 associated with the VIN 128.

Figure 3:
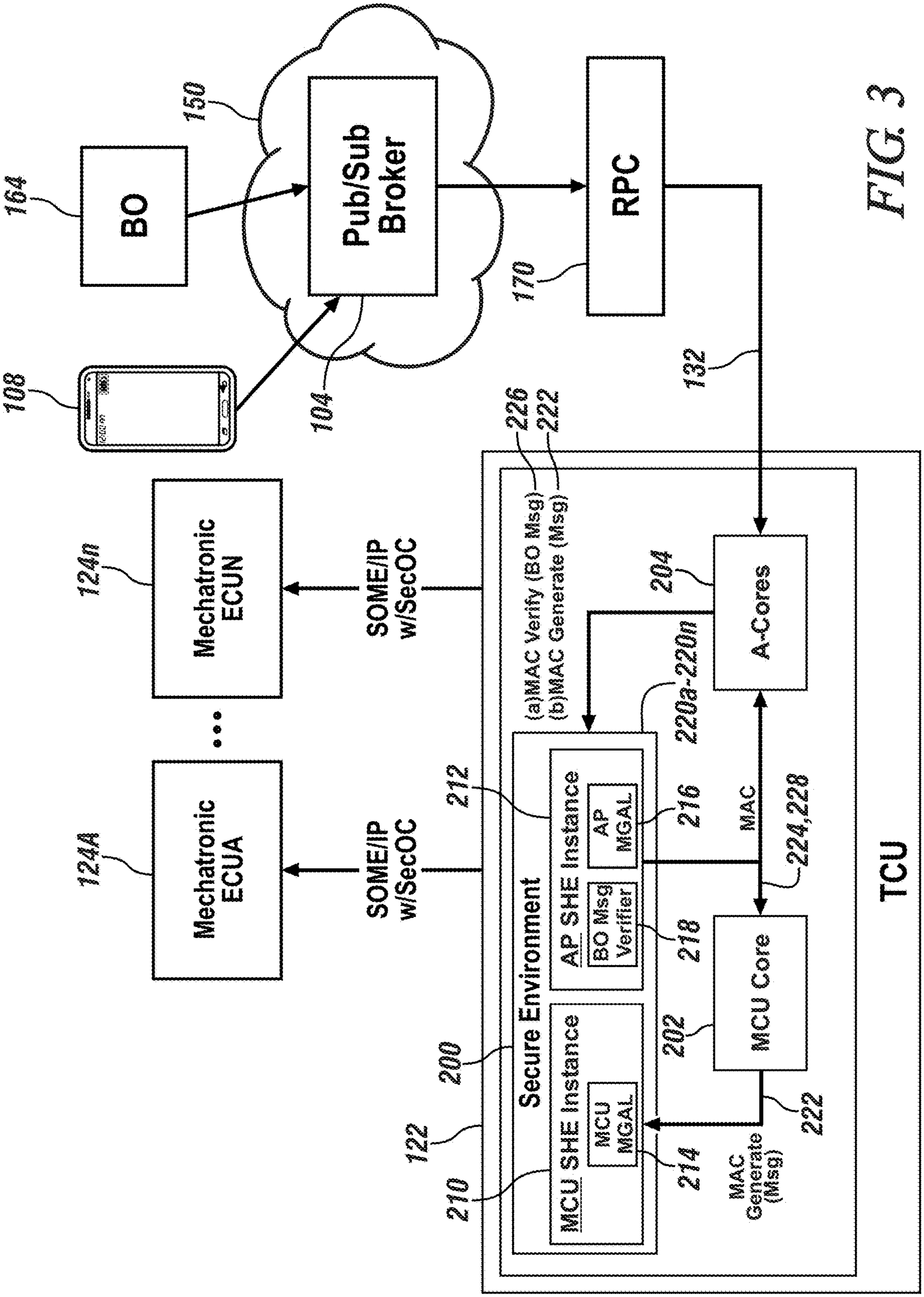
FIG. 3 is a schematic diagram of a telematics control unit and surrounding electronics in accordance with one or more exemplary embodiments.

Referring to FIG. 3, a schematic diagram of an example implementation of the TCU and surrounding electronics is shown in accordance with one or more exemplary embodiments. The TCU 122 generally includes a secure environment 200, a microcontroller unit (MCU) core 202, and one or more application cores 204 (A-Core) (one shown). The secure environment 200 includes an MCU secure hardware extension (SHE) instance 210 and an application (AP) SHE instance 212. The MCU SHE instance 210 hosts an MCU MAC generate allow list (MCU MGAL) 214. The AP SHE instance 212 hosts an AP MGAL 216 and a back office message verifier 218. Second keys 220*a*-220*n* are shared between the respective mechatronic ECUs 124*a*-124*n* and the TCU 122. The surrounding electronics generally include the broker computer 104, the mobile phones 108, the mechatronic ECU 124*a*-124*n*, the cloud 150, the back office entity 164, and the back office RPC handler 170.

A MAC generation message 222 may be received in the secure environment 200. If the MAC generation message 222 is verified, a MAC 224 is returned from the secure environment 200. A MAC verification message 226 may also be received in the secure environment 200.

Figure 4:
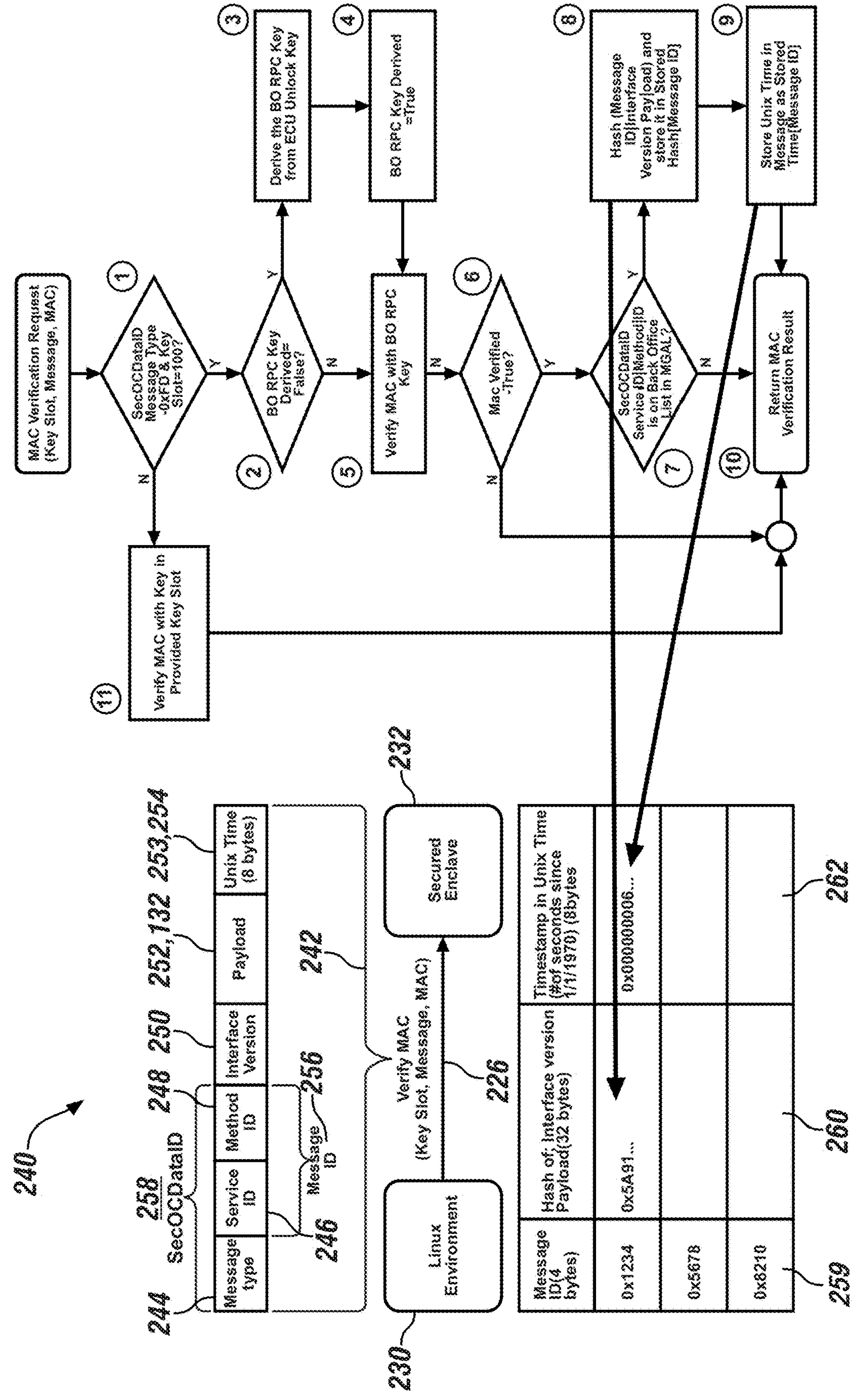
FIG. 4 is a flow diagram of a method for handling a request in accordance with one or more exemplary embodiments.

Referring to FIG. 4, with references to FIGS. 1-3, a flow diagram of an example method for handling a request is shown in accordance with one or more exemplary embodiments. The method (or process) 240 generally includes steps 1 to 11 as illustrated. The method 240 may be implemented by the system 100. The sequence of steps is shown as a representative example. Other step orders may be implemented to meet the criteria of a particular application. The TCU 122 may operate in a given (e.g., Linux) environment 230.

The secure environment 200 within the TCU 122 holds the second keys 220*a*-220*n* that are shared with the respective mechatronics ECUs 124*a*-124*n*. The mechatronic ECUs 124*a*-124*n* do not act on requests 132 from the TCU 122 unless the message containing the request 132 is protected with a message authentication code 224 (e.g., a second MAC 228), see FIG. 3, generated with the respective shared second keys 220*a*-220*n*.

By way of example, a message 242 may include a message type 244, a service ID 246, a method ID 248, an interface version 250, a payload 252, and a freshness value 254 (e.g., a Unix time 253). The service ID 246 and the method ID 248 form a message ID 256. The message type 244 and the message ID 256 form a SecOCDataID 258. The request 132 may be stored in the payload 252.

Secure enclaves 232 (e.g., secure environments within the system that have private resources to prevent the application processors from accessing sensitive information within private regions of memory in the secure environment 200) may not be used to generate the second MAC 228 for the TCU application domain unless a valid first message 144 protected by the back office RPC handler 170 is first received and verified according to the following steps.

1. The secure enclave 232 checks if the SecOCDataID message type 244 is a back office RPC (e.g., 0i xFD) and a key slot is 100.
   1i. The first key 142 may not actually be stored in the key slot 100, but the application core 204 may set the key slot to 100 for the MAC verification message 226 of the back office remote procedure calls.
2. The secure enclave 232 checks if the first key 142 has already been derived within the TCU 122. If the first key 142 has already been derived, the method 240 may continue with step 5, otherwise the method 240 may go to step 3 to derive the first key 142.
   2i. If the unlock key 176 is ever reprovisioned, the secure enclave 232 sets a first key derived flag to false to ensure that the first key 142 is derived again from the new unlock key 176.
3. The secure enclave 232 may derive the first key 142 from the unlock key 176 stored in key slot 1 (e.g., SHE key slot 4)
   3i. The first key 142 may be derived from the unlock key 176 in a way that the application core 204 cannot derive the first key 142. For example, deriving the first key 142 by generating a message authentication code 224 using the unlock key 176 is not allowed since the application core 204 lacks permission to generate message authentication codes 224 with the unlock key 176. Therefore, the derivation of the first key 142 may be as follows:
      1) Perform a SHA 256 hash of the unlock key 176.
      2) Several (e.g., 16) most significant bytes of the hash is used in the secure environment 200 to generate a message authentication code 224 over a unique constant.
      3) The message authentication code 224 from the step 2) is used as the first key 142 to verify the first MAC 140.
4. The secure enclave 232 subsequently sets a flag indicating that the first key 142 has been derived
5. The secure enclave may verify the first MAC 140 of the MAC verification message 226 using the first key 142.
6. If the first MAC 140 fails the verification, the secure enclave 232 returns from the function and provides the results to the host. If the first MAC 140 is verified, the method 240 continues with step 7.
7. If a message identification number 256 of the first message 144 is not in a back office list in the MGAL 214/216, the secure enclave 232 may return and provide the MAC verification result to the host. If the message identification number 256 of the first message 144 is in the back office list in the MGAL 214/216, the method 240 may continue with step 8.
8. To reduce an amount of memory consumed, the secure enclave 232 may hash the Message identification number 256|Interface Version 250|Payload 252 and store the hash (column 260) with the message identification number (e.g., column 259) and a timestamp of the freshness value 254 (e.g., column 262).
   8i. The secure enclave 232 generally stores the last several (e.g., 10) entries and not a single entry per message identification number 256 since the application core 204 may verify multiple valid requests with the same message identification number 256 prior to requesting a message authentication code 224 to be generated on a message 242 to be sent to the mechatronic ECUs 124*a*-124*n*.
9. The secure enclave 232 also stores the freshness value 254 in the verified message 242 along with the message identification number 256 and the hash.
10. The secure enclave 232 returns the first MAC 140 verification result to the host.
11. If step 1 is false, the first MAC 140 is verified with the first key 142 in a provided key slot. The secure enclave 232 may return the first MAC 140 verification result to the host in the step 10.

Figure 5:
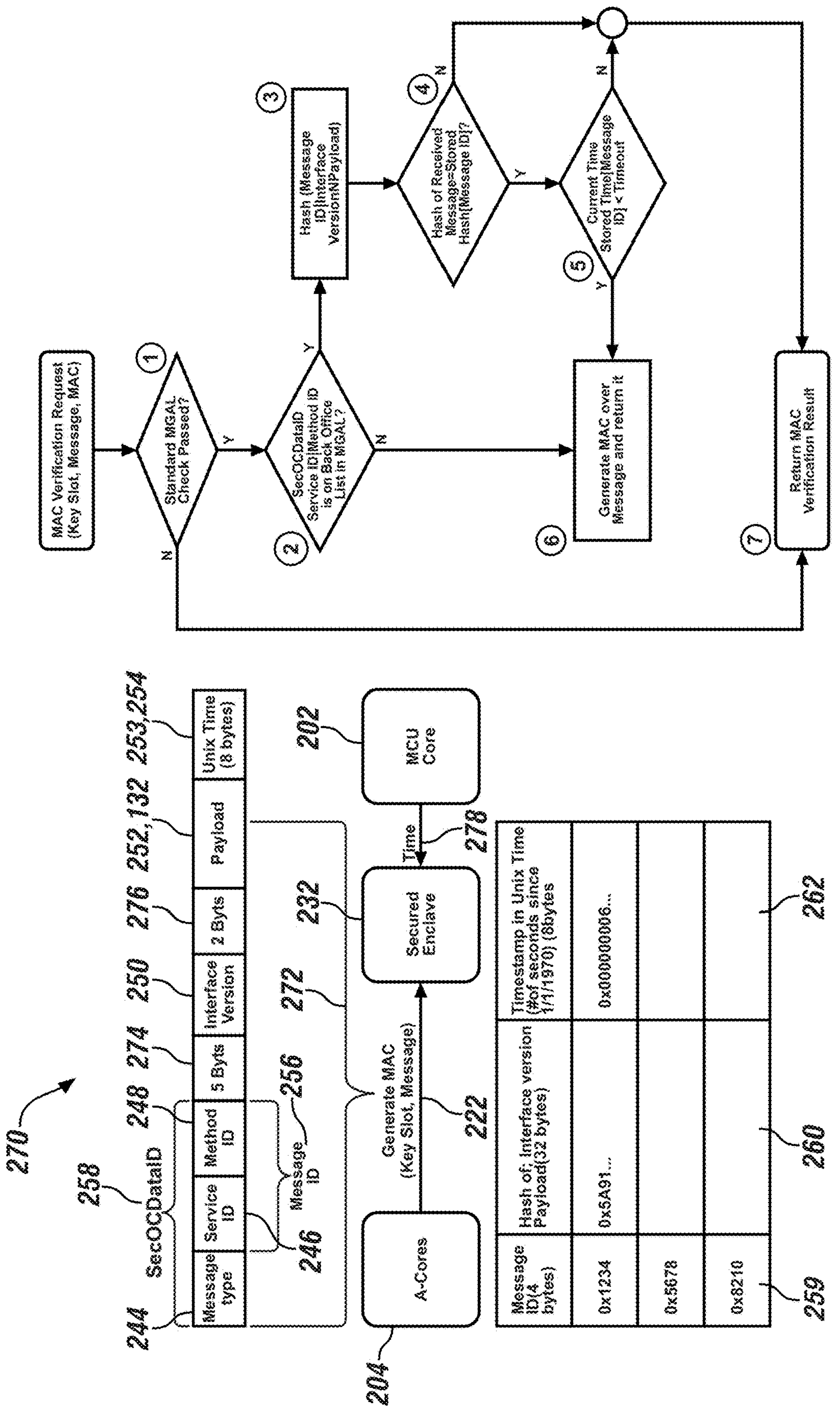
FIG. 5 is a flow diagram of a method to ensure that the request has already been received from a back office in accordance with one or more exemplary embodiments.

Referring to FIG. 5, with references to FIGS. 1-3, a flow diagram of an example method to ensure that the request 132 has already been received and verified from back office 106 is shown in accordance with one or more exemplary embodiments. The method (or process) 270 generally includes steps 1 to 7 as illustrated. The method 270 may be implemented by the system 100. The sequence of steps is shown as a representative example. Other step orders may be implemented to meet the criteria of a particular application.

By way of example, a message 272 may include the message type 244, the service ID 246, the method ID 248, a first buffer 274 (e.g., 5 bytes), the interface version 250, a second buffer 276 (e.g., 2 bytes), the payload 252, and the freshness value 254. The service ID 246 and the method ID 248 form a message ID 256. The message type 244 and the message ID 256 form a SecOCDataID 258. The request 132 may be stored in the payload 252.

In order for the secure environment 200 to authorize a host (e.g., the MCU core 202 or the application core 204) to send the request 132 that originates from the back office 106 to a mechatronic ECU 124*a*-124*n*, the secure environment 200 may perform the following steps to ensure that the request 132 has already been received from back office 106.

1. The secure enclave 232 checks the corresponding MGAL 214/216 to determine if the host is authorized to send a message 272 that a message authentication code 224 is requested over. If the check fails, the secure enclave 232 returns an MGAL failure to the host in the step 7 and returns from the call. Otherwise, the method 270 continues with step 2.
2. If the message identification number 256 is on the back office list in the MGAL 214/216, the secure enclave 232 continues with step 3. Otherwise, the secure enclave 232 continues with step 6.
3. The secure enclave 232 may hash the message identification number 256|Interface Version 250|Payload 252.
4. The secure enclave 232 checks if the hash of the message 272 matches at least one stored hash associated with the message identification number 256. If there is a match, the method 240 continues with step 5. If the hash does not match at least one stored hash for the message identification number 256, the secure enclave 232 returns an MGAL failure to host and returns from the call.

5. The secure enclave 232 compares the current time 278 and the stored freshness value 254. The comparison is used to check if a difference between the current time 278 and the stored freshness value 254 for the matched message is less than a timeout period (or value) defined in the MGAL 214/216 (e.g., 40 seconds to 80 seconds). If the time difference is less than the timeout period (e.g., 60 seconds), the secure enclave 232 erases the stored hash (e.g., in column 260) and continues with step 6. If the time difference is greater than or equal to the timeout period, the secure enclave 232 returns an MGAL failure to the host in the step 7.
6. The secure enclave 232 generates the message authentication code 224 over the message 272 and returns the message authentication code 224 to the host. The host is subsequently able to send the request 132 to the target mechatronics ECU 124*a*-124*n* with a second MAC 228 so that the target mechatronics ECU 124*a*-124*n* acts on the request 132.

Embodiments of the disclosure generally prevent a compromised publisher/subscriber broker computer in the cloud from creating/sending false requests to vehicles that are intended to originate from mobile phones and back office entities. If the vehicle trusts the broker (e.g., through a mutual transport layer security (mTLS) session) to only provide legitimate requests, a compromised broker may compromise an entire fleet of vehicles. The risk of compromise is generally mitigated by having a back office verify that the requestor is authorized to send the request to the vehicle by verifying a token signed by a trusted entity. The token indicates which requests the entity may send to which vehicles. The back office uses a vehicle identification number in the request to determine a telematics control unit identification number in the vehicle and subsequently to obtain a symmetric key (e.g., a first key) unique to the telematics control unit which was provided to the back office by a back office distribution server. The back office uses the first key to generate a first message authentication code over authorized requests prior to the requests being sent to the telematics control unit through the publisher/subscriber broker. When the telematics control unit is manufactured, it is provisioned with an TCU identification number and device-unique key (e.g., an unlock key) that a secure environment uses to derive the first key to check if the request was authorized by the back office thereby rejecting requests created by a compromised publisher/subscriber broker.

Various embodiments also prevent a compromised application domain (host) within the telematics control unit from spoofing mobile phones and back office entities that are authorized to request mechatronics electronic control unit to perform various actions, such as immobilizing the vehicle. The prevention is achieved by having the secure environment within the telematics control unit prohibited from generating a message authentication code over certain messages (as defined within a MAC generate allow list policy) unless it is first provided an authentic first message from the back office that authorizes the request to be sent to mechatronic electronic control unit. The first message from the back office is verified by the secure environment using a key only accessible to itself and the back office. Without this verification, the secure environment may not provide the host with the requested message authentication code, without which the telematics control unit is unable to send the message to mechatronic electronic control units such that the electronic control units would act on the message. The host may also submit a message authentication code generate request to the secure environment within a period of time from when the first message authorized by the back office was created to prevent replay attacks.

Embodiments of the system/method may facilitate selective additional protection of particular types of messages coming to software-defined vehicles through a publication/subscription broker so that if the publication/subscription broker is compromised, it is unable to spoof the source of the messages (e.g., original equipment manufacturer back office, mobile phones) and cause the vehicles to act on the requests.

Various embodiments facilitate selective additional protection of the messages coming to software-defined vehicles so that if an in-vehicle telematics control unit is compromised, it is not able to spoof the source of the messages (original equipment manufacturer back office, mobile phones) and cause the vehicle to act on the requests.

Due to the use of symmetric cryptography for the additional protection, the system/method provides protection against quantum computing. The use of symmetric cryptography also allows the vehicle to quickly verify time-sensitive requests, such as vehicle access requests.

The system/method leverage common interfaces to verify messages coming through the publication/subscription broker and messages coming from other in-vehicle devices. The system/method may also reduce the computational load on in-vehicle cryptographic server by only obtaining a key from the cryptographic server once, where the key may subsequently be accessed locally to authorize subsequent requests.

Embodiments of the disclosure generally provide a system to secure a remote request to a vehicle. The system includes the vehicle, a broker computer, and a back office computer. The vehicle includes a telematics control unit and a mechatronics electronic control unit. The broker computer receives from a requestor a token and a request for the mechatronics electronic control unit to process a task. The back office computer receives the token and the request from the broker computer, confirms that the requestor is authorized to send the request to the vehicle based on the token, generates a first message authentication code for the request based on a first key in response to the confirmation that the requestor is authorized, generates a first message that is protected by verification data, and transfers the request, the first message authentication code, and the first message to the broker computer through the broker computer to the telematics control unit in the vehicle.

The telematics control unit verifies the first message authentication code based on the first key (shared with the back office computer), checks an origin of the first message, and transfers the request to the mechatronics electronic control unit in response to the first message authentication code being verified and the first message originating from the back office computer.

Numerical values of parameters (e.g., of quantities or conditions) in this specification, including the appended claims, are to be understood as being modified in each instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of values and further divided ranges within the entire range. Each value within a range and the endpoints of a range are hereby disclosed as a separate embodiment.

While the best modes for carrying out the disclosure have been described in detail, those familiar with the art to which this disclosure relates will recognize various alternative designs and embodiments for practicing the disclosure within the scope of the appended claims.

What is claimed is:

1. A system comprising:

a vehicle with a telematics control unit and a mechatronics electronic control unit;

a broker computer operational to receive from a requestor a token and a request for the mechatronics electronic control unit to process a task;

a back office computer operational to:

receive the token and the request from the broker computer;

confirm that the requestor is authorized to send the request to the vehicle based on the token;

generate a first message authentication code for the request based on a first key in response to the confirmation that the requestor is authorized, wherein:

the first key is unique to the telematics control unit; and the first key is derived from a telematics control unit identification number and a unique unlock key provisioned in the telematics control unit during manufacture;

generate a first message that is protected by verification data; transfer the request, the first message authentication code, and the first message to the broker computer;

receive a notification in response to the telematics control unit being replaced in the vehicle with a new telematics control unit; and generate the first key based on the new telematics control unit, wherein:

the broker computer is further operational to transfer the request, the first message authentication code, and the first message to the telematics control unit; and the telematics control unit is operational to:

verify the first message authentication code based on the first key, wherein the first key is shared with the back office computer;

check an origin of the first message; and transfer the request to the mechatronics electronic control unit in response to the first message authentication code being verified and the first message originating from the back office computer.

2. The system according to claim 1, wherein:

the telematics control unit is further operational to:

generate a second message authentication code based on a second key in response to the first message authentication code being verified; and transfer the second message authentication code with the request to the mechatronics electronic control unit; and the second key is shared between the telematics control unit and the mechatronics electronic control unit.

3. The system according to claim 2, wherein:

the mechatronics electronic control unit is operational to:

verify the second message authentication code based on second key; and process the request in response to the second message authentication code being verified.

4. The system according to claim 2, wherein:

the telematics control unit is further operational to:

parse a freshness value received in the first message; and compare the freshness value with a current time; and the second message authentication code is generated in response to the current time being less than a timeout period after the freshness value.

5. The system according to claim 1, wherein:

the back office computer is further operational to derive the first key.

6. The system according to claim 5, wherein:

the telematics control unit is further operational to derive the first key.

7. The system according to claim 1, wherein the requestor is a back office entity.

8. The system according to claim 1, wherein the requestor is a mobile phone.

9. A method to secure a remote request to a vehicle comprising:

receiving at a broker computer from a requestor a token and a request for a mechatronics electronic control unit in the vehicle to process a task;

receiving at a back office computer the token and the request from the broker computer;

confirming in the back office computer that the requestor is authorized to send the request to the vehicle based on the token;

generating in the back office computer a first message authentication code for the request based on a first key in response to the confirmation that the requestor is authorized, wherein:

the first key is unique to a telematics control unit in the vehicle; and the first key is derived from a telematics control unit identification number and a unique unlock key provisioned in the telematics control unit during manufacture;

generating in the back office computer a first message that is protected by verification data;

transferring the request, the first message authentication code, and the first message from the back office computer to the broker computer;

transferring the request, the first message authentication code, and the first message from the back office computer to the telematics control unit;

verifying in the telematics control unit the first message authentication code based on the first key, wherein the first key is shared with the back office computer;

checking in the telematics control unit an origin of the first message;

transferring the request to the mechatronics electronic control unit in response to the first message authentication code being verified and the first message originating from the back office computer;

receiving at the back office computer a notification in response to the telematics control unit being replaced in the vehicle with a new telematics control unit; and generating in the back office computer the first key based on the new telematics control unit.

10. The method according to claim 9, further comprising:

generating in the telematics control unit a second message authentication code based on a second key in response to the first message authentication code being verified; and transferring the second message authentication code with the request from the telematics control unit to the mechatronics electronic control unit, wherein:

the second key is shared between the telematics control unit and the mechatronics electronic control unit.

11. The method according to claim 10, further comprising:

verifying in the mechatronics electronic control unit the second message authentication code based on second key; and processing in the mechatronics electronic control unit the request in response to the second message authentication code being verified.

12. The method according to claim 10, further comprising:

parsing in the telematics control unit a freshness value received in the first message; and comparing in the telematics control unit the freshness value with a current time, wherein:

the second message authentication code is generated in response to the current time being less than a timeout period after the freshness value.

13. The method according to claim 9, further comprising:

deriving in the back office computer the first key from a telematics control unit identification number and a unique unlock key provisioned in the telematics control unit during manufacture.

14. The method according to claim 13, further comprising:

deriving in the telematics control unit the first key from the telematics control unit identification number and the unique unlock key.

15. The method according to claim 9, wherein the requestor is a back office entity.

16. The method according to claim 9, wherein the requestor is a mobile phone.

17. A vehicle comprising:

a mechatronics electronic control unit operational to perform a task; and a telematics control unit in communication with the mechatronics electronic control unit and operational to receive from a requestor through a broker computer a request, a first message authentication code, and a first message, wherein:

the requestor is confirmed as authorized to send the request to the vehicle based on a token before the request is transferred to the vehicle;

the first message authentication code for the request is generated based on a first key in response to the confirmation that the requestor is authorized;

the first key is unique to the telematics control unit;

the first key is derived from a telematics control unit identification number and a unique unlock key provisioned in the telematics control unit during manufacture; and the first message is protected by verification data, wherein:

the telematics control unit is further operational to:

verify the first message authentication code based on the first key, wherein the first key is shared with a back office computer;

check an origin of the first message;

generate a second message authentication code based on a second key in response to the first message authentication code being verified, wherein the second key is shared between the telematics control unit and the mechatronics electronic control unit; and transfer the request and the second message authentication code to the mechatronics electronic control unit in response to the first message authentication code being verified and the first message originating from the back office computer;

the mechatronics electronic control unit is further operational to:

verify the second message authentication code based on second key; and process the request to perform the task in response to the second message authentication code being verified; and the back office computer is operational to:

receive a notification in response to the telematics control unit being replaced in the vehicle with a new telematics control unit; and generate the first key based on the new telematics control unit.

18. The vehicle according to claim 17, wherein:

the telematics control unit is further operational to:

parse a freshness value received in the first message; and compare the freshness value with a current time; and the second message authentication code is generated in response to the current time being less than a timeout period after the freshness value.

19. The vehicle according to claim 17, wherein the requestor is a back office entity.

20. The vehicle according to claim 17, wherein the requestor is a mobile phone.

* * * * *